United States Patent
Venkataraman et al.

(10) Patent No.: US 10,635,497 B2
(45) Date of Patent: Apr. 28, 2020

(54) METHOD AND APPARATUS FOR JOB PRE-SCHEDULING BY DISTRIBUTED JOB MANAGER IN A DIGITAL MULTI-PROCESSOR SYSTEM

(71) Applicant: Cavium, LLC, Santa Clara, CA (US)

(72) Inventors: Kalyana Sundaram Venkataraman, Santa Clara, CA (US); Tejas Maheshbhai Bhatt, Sunnyvale, CA (US); Hong Jik Kim, San Jose, CA (US); Eric Marenger, Montreal (CA); Ahmed Shahid, San Jose, CA (US); Jason Daniel Zebchuk, Watertown, MA (US); Gregg Alan Bouchard, Georgetown, TX (US)

(73) Assignee: Cavium, LLC, Santa Clara, CA (US)

( * ) Notice: Subject to any disclaimer, the term of this patent is extended or adjusted under 35 U.S.C. 154(b) by 260 days.

(21) Appl. No.: 15/588,240

(22) Filed: May 5, 2017

(65) Prior Publication Data
US 2018/0321983 A1 Nov. 8, 2018

(51) Int. Cl.
*G06F 9/46* (2006.01)
*G06F 9/50* (2006.01)
*G06F 9/48* (2006.01)

(52) U.S. Cl.
CPC .......... *G06F 9/5044* (2013.01); *G06F 9/4881* (2013.01); *G06F 9/5027* (2013.01)

(58) Field of Classification Search
CPC ...... G06F 9/5044; G06F 9/5027; G06F 9/505; G06F 9/4881; G06F 9/5038; G06F 9/5083; H04L 67/10; H04L 67/1002; H04L 67/1004; H04L 67/1025; H04L 67/1029; H04L 67/1031; H04L 67/1007; H04L 67/101; H04L 67/1012; H04L 67/1014; H04L 67/1017; H04L 67/1019; H04L 67/1023; H04L 67/1006
See application file for complete search history.

(56) References Cited

U.S. PATENT DOCUMENTS

| | | | | |
|---|---|---|---|---|
| 7,694,007 | B1 * | 4/2010 | Dubrovsky | G06F 9/505 709/232 |
| 9,870,269 | B1 * | 1/2018 | Viswanathan | G06F 9/50 |
| 2003/0093499 | A1 * | 5/2003 | Messinger | G06F 9/5038 709/219 |
| 2006/0136638 | A1 * | 6/2006 | Banning | G06F 9/505 710/244 |

(Continued)

*Primary Examiner* — Emerson C Puente
*Assistant Examiner* — Zhi Chen
(74) *Attorney, Agent, or Firm* — pkalousek.ip

(57) ABSTRACT

A method and a system embodying the method for job pre-scheduling in a processing system comprising distributed job management, encompassing: determining a maximum amount of pre-schedulable jobs for each of a plurality of engines; setting for each of the plurality of engines a threshold less than or equal to the maximum amount; pre-scheduling by a scheduler an amount of jobs less than or equal to the threshold to at least one of a plurality of job managers; determining at the at least one of the plurality of job managers managing one of the plurality of engines one of a plurality of data processing devices in order for each pre-scheduled job; and assigning the job to the determined data processing device.

20 Claims, 6 Drawing Sheets

(56) References Cited

U.S. PATENT DOCUMENTS

| | | | |
|---|---|---|---|
| 2007/0094556 A1* | 4/2007 | Udell | G01R 31/31831 |
| | | | 714/724 |
| 2007/0276934 A1* | 11/2007 | Lai | H04L 67/1002 |
| | | | 709/223 |
| 2008/0007765 A1* | 1/2008 | Ogata | G06F 9/4843 |
| | | | 358/1.15 |
| 2008/0201379 A1* | 8/2008 | Nakate | G11B 27/034 |
| 2009/0210356 A1* | 8/2009 | Abrams | G06Q 20/145 |
| | | | 705/400 |
| 2009/0239480 A1* | 9/2009 | Rofougaran | H04L 12/40013 |
| | | | 455/73 |
| 2010/0198920 A1* | 8/2010 | Wong | G06F 9/544 |
| | | | 709/206 |
| 2016/0004569 A1* | 1/2016 | Kim | G06F 9/5027 |
| | | | 718/104 |
| 2016/0034324 A1* | 2/2016 | Liu | G06F 9/542 |
| | | | 719/318 |
| 2016/0117628 A1* | 4/2016 | Brophy | G06F 17/2854 |
| | | | 704/2 |
| 2016/0292011 A1* | 10/2016 | Colson | G06F 9/5044 |
| 2017/0289242 A1* | 10/2017 | Keppel | H04L 67/1008 |

\* cited by examiner

METHOD AND APPARATUS FOR JOB PRE-SCHEDULING BY DISTRIBUTED JOB MANAGER IN A DIGITAL MULTI-PROCESSOR SYSTEM

BACKGROUND

1. Field

The present disclosure relates to digital processing systems. More particularly, this invention is directed toward a configurable, scalable, distributed job manager for a digital multi-processor system.

2. Description of Related Technology

Digital data processing systems are systems that numerically manipulate data in the form of discrete, discontinuous sequences of numbers or symbols. Such data may represent any type of information, e.g., text, images, signals, or any other type of information known to a person of ordinary skill in the art.

Recent increases in the complexity of digital data processing algorithms have resulted in significant technological innovations. Such innovations include the use of configurable environments and software defined algorithmic processors to adapt to ever evolving algorithms and standards, and the use of multiple processing devices to satisfy the large processing requirements. These innovations increase the demands on the design of a modern digital processing system.

Design of the digital data processing system implementing the digital data processing algorithms may require execution of a plurality of jobs, i.e., specific tasks, where each job is to be performed by one of multiple processing devices. The plurality of jobs must be efficiently scheduled among the plurality of the processing devices. The scheduling must take into account an architecture of the data processing system and a structure of the data processing algorithm. Such consideration comprises, e.g., the architecture of the processing devices, the ability of the processing devices to process a type of job, the required coordination and/or sequence among the jobs, dependence of the jobs on external events, and other considerations known to a person of ordinary skill in the art. In real time applications, the digital data processing may further require the scheduling to adhere to strict timelines defined by the digital data processing algorithms. In addition, a flexible scheduling solution is needed, to allow customer specific digital data processing algorithms.

An example of such complex digital data processing algorithms comprises baseband processing in a wireless communication system, i.e., processing related to all the radio control functions, such as signal generation, modulation, encoding, frequency shifting, transmission of signals, and other radio control functions known to a person of ordinary skills in the art. Baseband processing is performed by a baseband processor, which may comprise a plurality of data processing devices, such as digital signal processors (DSP) and hardware accelerators, which must work in a coordinated fashion.

To perform processing of the scheduled job, a processing device may need to read data from or write data to one or more memories of the data processing system. Consequently, each processing device comprises a plurality of physical read ports and write ports through which the one or more memories are accessed. Although any means of access may be used, typically each port uses a form of Direct Memory Access (DMA) for coordinating the timing of data transfers between the processing device and the one or more memories.

To coordinate progress of a scheduled job at a processing device, including the control and coordination among the DMA engines, the data processing system may comprise a centralized scheduler. However, such a centralized approach, wherein a single job scheduler distributes jobs directly to individual processing devices does not scale well as the number of the processing devices increases. Additionally, control and coordination of jobs on a processing device is typically customized for each individual processing device, placing additional demands on the scheduler. To enable the scheduler to manage the information needed for scheduling decisions, the amount of the information may be limited, thus the scheduler may lack some information, preventing the scheduler from making the optimal decision.

Accordingly, there is a need in the art for an implementation of a system and method for optimizing flexible scheduling of jobs and coordinating progress of a scheduled job at the processing device, providing a solution to the above identified problems, as well as additional advantages evident to a person having ordinary skill in the art.

Accordingly, there is a need in the art for an implementation of a system and method for optimizing flexible scheduling of jobs and coordinating progress of a scheduled job at the processing device including management of the processing device's ports, providing a solution to the above identified problems, as well as additional advantages evident to a person having ordinary skill in the art.

SUMMARY

In an aspect of the disclosure, a method and an apparatus implementing the method for job pre-scheduling in a processing system comprising distributed job management according to the appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1A:
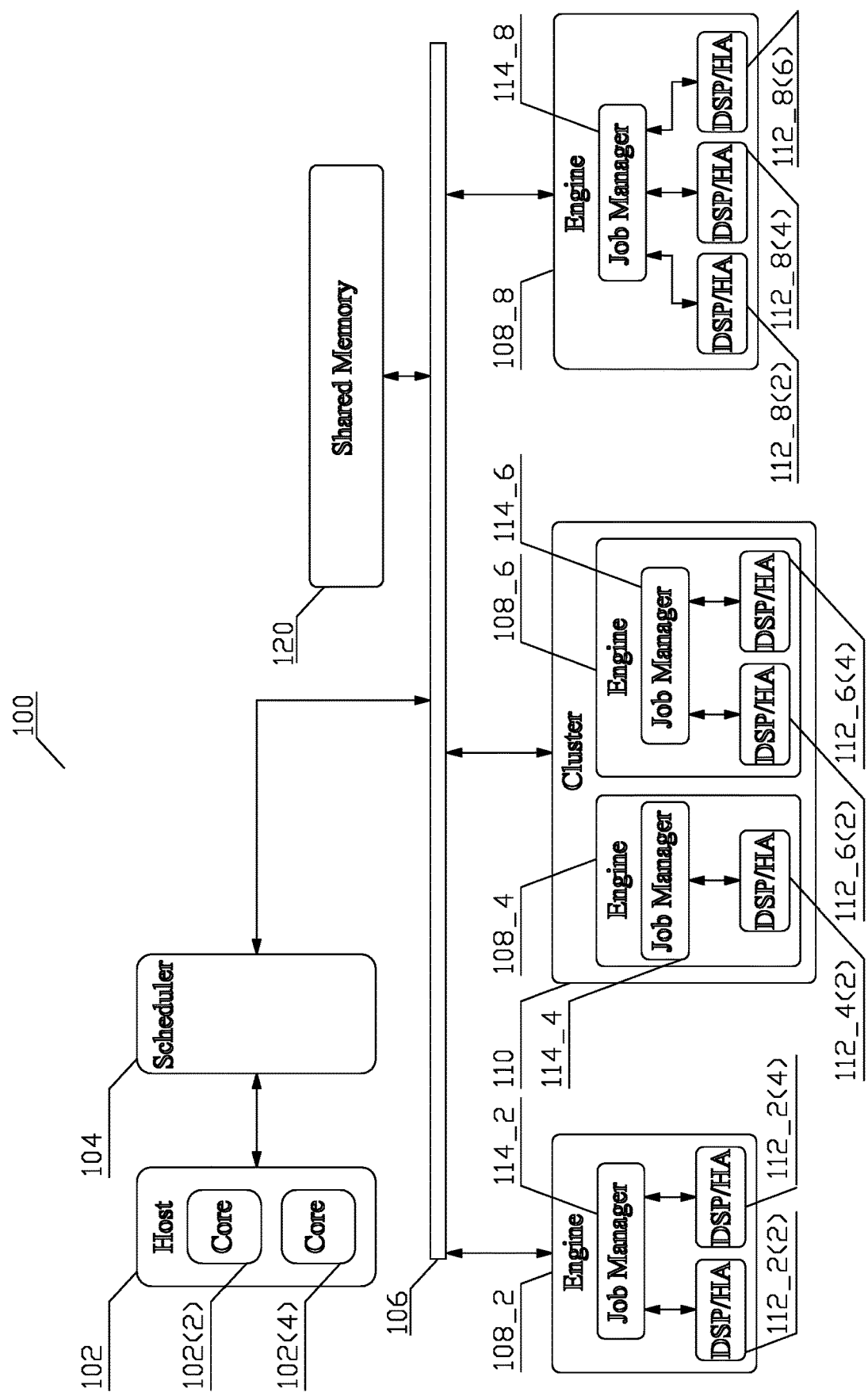
FIG. 1a depicts a conceptual structure of a system 100 enabling configurable, scalable, distributed job management in accordance with aspects of this disclosure.
Figure 1B:
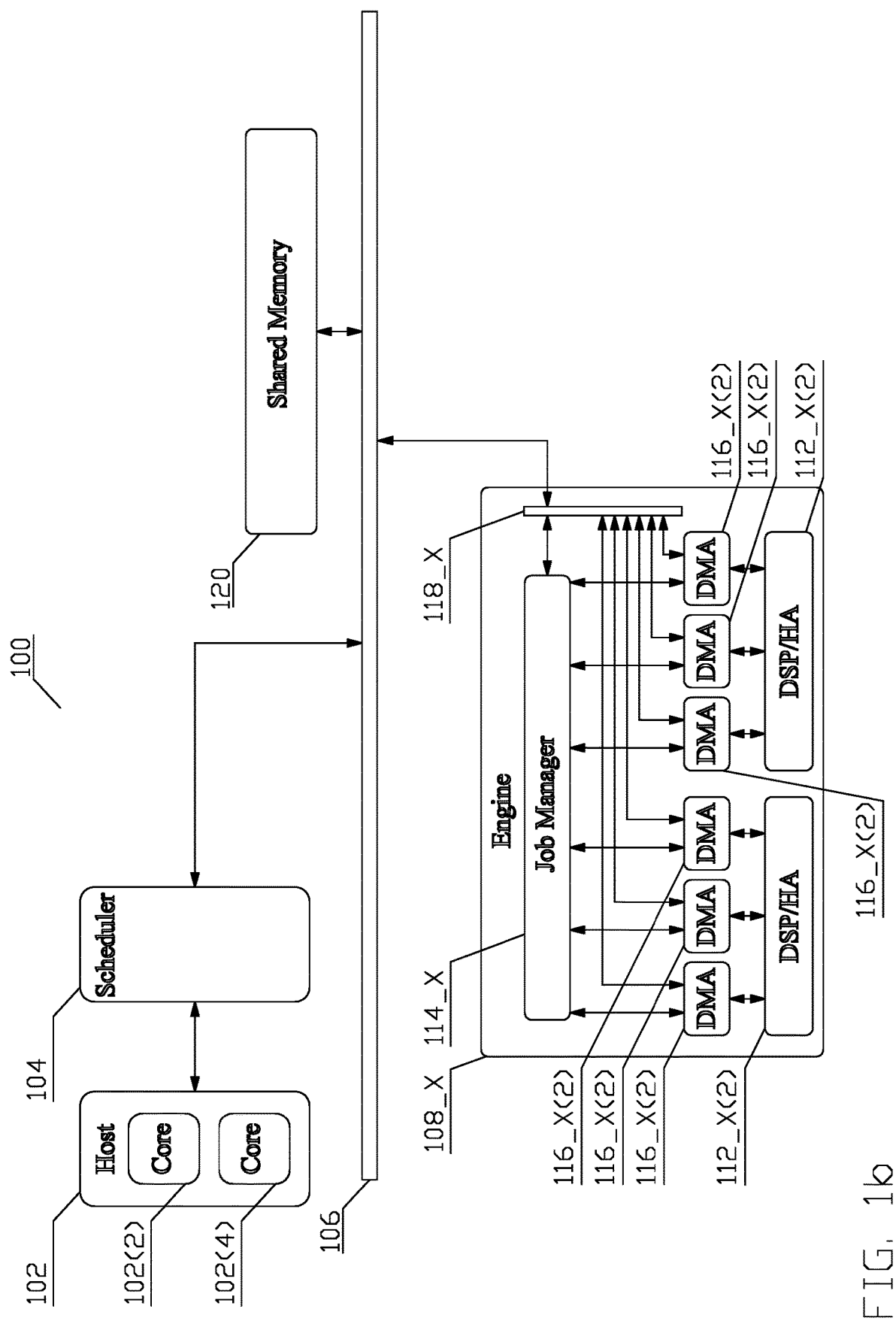
FIG. 1b depicts the conceptual structure of a system 100 in greater detail in regards of one of the sub-structures.
Figure 2:
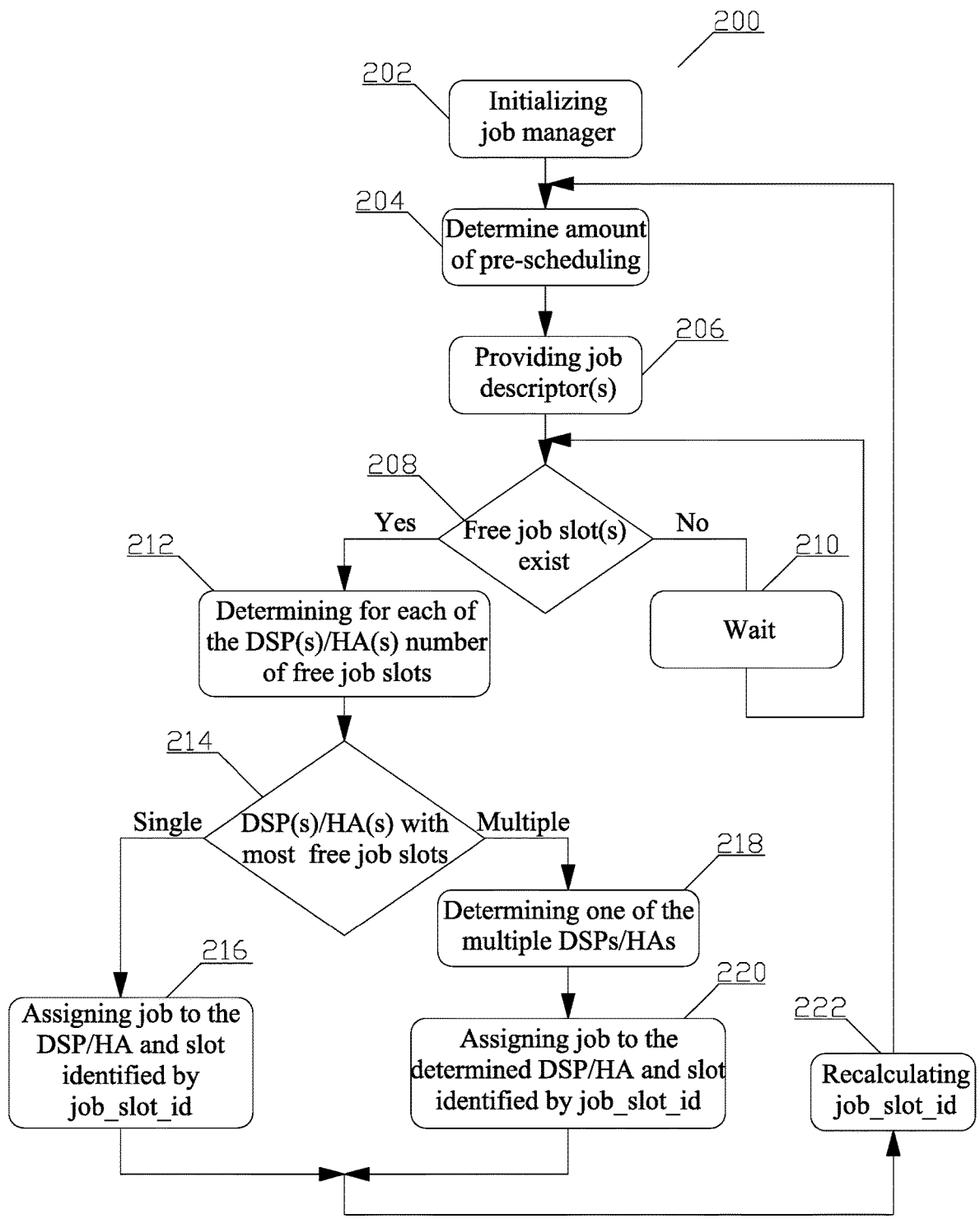
FIG. 2 depicts a flow chart of a process for job pre-scheduling in accordance with an aspect of this disclosure.

The description of like structural elements among the figures, is not repeated, the like elements have reference numerals differing by an integer multiple of 100, i.e., reference numeral 102 in FIG. 1a, 1b, becomes reference numeral 202 in FIG. 2; unless differences and/or alternative aspects are explicitly noted. An expression "_X" in a reference indicates an instance of an element of a drawing where helpful for better understanding. Any unreferenced single or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1a depicts a conceptual structure of a system 100 enabling configurable, scalable, distributed job management in accordance with aspects of this disclosure. The system 100 may be embodied as an assembly of one or more integrated circuits. The functionality of the depicted blocks and modules of the system 100 may comprise pure hardware entities, and/or hardware entities supporting execution of a firmware and/or software. As well known to a person of ordinary skill in the art, firmware is a type of software that provides control, monitoring and data manipulation of a hardware entity that executes the firmware. Unlike software, firmware is not meant to be changed, the reasons for changing firmware include fixing bugs or adding features to the hardware entity.

A job is represented by a job command, identifying a task to be performed by a resource. The job command may comprise, e.g., a job identifier and a location of a job descriptor. The job descriptor provides the detailed information necessary to describe the specific task to be performed by one of a plurality of resources. The job descriptor structure, an example of which is disclosed in greater detail in reference to FIG. 4 and associated text infra, comprises zero or more section. A job descriptor section may comprise a pointer to a location in one or more memories, e.g., a shared memory 120, where the job descriptor section resides. The memory location comprises zero or more configuration word(s) as disclosed in greater detail in FIG. 4 and associated text infra. The configuration word(s) provide(s) parameters for the job, descriptions of the input data for the job, descriptions of the output data to be produced by the job, and/or any other information relevant to the job as known to a person of ordinary skill in the art. Alternatively, a job descriptor section may comprise the zero or more configuration word(s), thus no additional accesses to the shared memory 120 are required. A shared memory comprises a memory that may be shared by a plurality of resources.

A host 102 comprising one or more controller cores 102(X) executing a control software initializes a programmable hardware scheduler module 104 that selects a job from a plurality of jobs to be accomplished and dispatches the job to a resource capable of the job processing via a communication coupling 106. The communication coupling 106 may comprise a fully buffered crossbar switch, a bus, or any other communication coupling known to a person of ordinary skill in the art. In an aspect, the communication coupling 106 may comprise a cross-bar switch disclosed in a co-pending application entitled METHOD AND APPARATUS FOR MULTIPLE ACCESS OF PLURAL MEMORY BANKS, filed on Aug. 2, 2012, application Ser. No. 13/565,735. The selection of the resource is controlled by the programmable hardware scheduler module 104, designed according to criteria, including, but not being limited to the timing of job submission, control flow between jobs, job status logging, and various other support functions known to a person of ordinary skill in the art. In an aspect, the scheduling may be carried out according to aspects disclosed in a co-pending application entitled PROGRAMMABLE HARDWARE SCHEDULER FOR BASEBAND PROCESSING, filed on Jun. 5, 2017, Application Ser. No. 15/613,889.

A resource ultimately responsible for processing a job comprises one of a plurality of engines 108_X. As depicted in FIG. 1a, a subset of the plurality of the engines 108_X, e.g., engines 108_4, 108_6, may be organized into and implemented in hardware as one or more physical clusters 110, sharing one or more resources, e.g., a common data path, i.e., bandwidth, a memory, and other shared resource known to a person of ordinary skill in the art. The engines 108_X not belonging to the at least one subset stand alone, e.g., engines 108_2, 108_8. However, other organizations of the resources, i.e., all engines 108_X being stand alone, or all engines 108_X being organized into one or more physical clusters 110 are contemplated. Additionally, as disclosed in the above-referenced application PROGRAMMABLE HARDWARE SCHEDULER FOR BASEBAND PROCESSING, to properly manage load balancing due to a fixed nature of the structure of the physical cluster as well as due to the difference between the structure of a cluster and a stand-alone engine, the control software may organize any of the engines 108_X, regardless of their status of belonging to a physical cluster 110 or stand alone, into one or more virtual clusters (not shown).

Any engine 108_X may comprise at least one data processing device 112_X(X) and a job manager 114. The plurality of data processing devices comprises digital signal processors (DSP) and/or hardware accelerators (HA). A DSP is a specialized processor, the architecture of which is optimized for the operational needs of digital signal processing, i.e., numerical manipulation of digital signals; a HA comprises a firmware controlled hardware device or a pure hardware device, i.e., a device not requiring any firmware, designed to perform at least one pre-determined data processing function, e.g., Viterbi decoder, fast Fourier transform, and other functions known to a person of ordinary skill in the art.

The processing effectiveness of each of the plurality of the DSPs or HAs 112_X(X) may be extended by adding support for multiple concurrent jobs processing. The multiple concurrent jobs may be supported, by, e.g., the use of pipelining, the use of multiple parallel execution units, or by combination of pipelining with multiple parallel execution units. As known in the art pipelining is an organization of a processing entity into a plurality of execution units that can operate concurrently on different jobs. Each job passes through the plurality of execution units one at a time and in-order, and once an execution unit completes processing of a job, the execution unit begins processing of the next job while the completed job is processed by the next execution unit.

Thus, in one aspect, each of the plurality of the DSPs or HAs 112_X(X) may support multiple concurrent jobs by use of pipelining. Each DSP or HA 112_X(X) may be divided into a plurality of q stages called pipeline slots. Each job assigned to the engine passes through each of the q stages in-order, and at any time each stage may be operating on a different job. Since each stage may operate on a different job, a single DSP or HA 112_X(X) may process up to q simultaneous jobs, and an engine 108_X comprising r number of DSPs or HAs 112_X(X) may process up to p=q*r simultaneous jobs. A person of ordinary skill in the art will appreciate that for the design case r=1, the DSP or HA 112_X(X) degenerates to processing the assigned jobs in series, one job at a time.

FIG. 1b depicts the conceptual structure of a system 100 with a detailed conceptual structure of an engine 108_X. As alluded to supra, the movement of data to and from the engine is implemented e.g., by at least one Direct Memory Access (DMA) engine 116, each DMA engine 116 being communicatively coupled to a physical read port and/or write port at each DSP or HA 112_X(X), a communicative coupling 118_X internal to the engine 108_X, and communicative coupling 106.

Each job manager 114_X is responsible for coordinating progress of the scheduled jobs for an associated engine 108_X; thus, the task of coordination of progress of scheduled jobs is distributed among a plurality of job managers 114_X. The job manager 114_X may comprise a firmware controlled hardware entity, a pure hardware entity, i.e., an entity not requiring any firmware, or a software entity executing on a processor. Upon receiving the job, the job manager 114_X of the engine 108_X selected by the scheduler module 104 selects a specific DSP or HA 112_X(X) in accordance with a load balancing criteria and administers the job descriptor for the assigned job. Since the job descriptor may comprise multiple commands for the DSPs or HAs 112_X(X) and multiple commands for the plurality of DMA engines 116_X(X) associated with the DSP or HA 112_X (X), and since each DSP or HA 112_X(X) may support multiple active jobs, the job manager 114_X dispatches commands from the different job descriptors in-order, to the appropriate DSP(s) or HA(s) 112_X(X) and to the appropriate DMA engine(s) 116_X(X).

To optimize job processing, when multiple engines 108_X are capable of processing a job, it may be beneficial to assign the job to the least loaded engine 108_X and the least loaded DSP or HA 112_X(X) within the engine 108_X to balance the workloads and memory traffic, thus improving the overall performance of the processing system.

Further, to mitigate the scheduling latency and the latency of reading job descriptors from memory, the scheduler module 104 schedules for each job manager 114_X more jobs than the managed engine 108_X can simultaneously process. The scheduler module 104 may thus pre-schedule jobs for each engine 108_X before the job are scheduled by a job manager 114_X to the DSPs or HAs 112_X(X) comprising the respective managed engine 108_X. The maximum amount of pre-schedulable jobs for each engine 108_X is fixed to a value determined by a specific engine's design in accordance with resources available at the specific engine 108_X required to buffer all pre-scheduled jobs.

The control software executing on the host 102 may further control the amount of pre-scheduling for each engine(s) 108_X by setting a threshold between zero and the maximum amount. The control software determines the threshold in accordance with parameters comprising: the characteristics of the processing algorithm to be carried out, e.g., the job types, required latencies; the characteristics of the processing system 100, e.g., the number and composition of the engines 108_X, the job type(s) the DSPs or HAs 112_X(X) comprising a specific engine 108_X are capable of processing, and other parameters known to a person of ordinary skill in the art. By means of an example, the control software may increase the threshold when the average scheduling and job descriptor fetch latencies are high. Also, the control software may increase the threshold for a specific engine 108_X, when that specific engine is the sole engine to which the scheduler module 104 always schedules jobs of a certain type. Alternatively, when a number of time-critical jobs can be scheduled on multiple different engine(s) 108_X, the control software may reduce the threshold to avoid a case where one engine 108_X becomes idle while many pre-scheduled jobs have already been assigned to another engine(s) 108_X that is still processing job(s).

The control software executing on the host 102 programs the threshold to either the scheduler module 104 or each of the job managers 114_X upon the system 100 initialization as disclosed in detail infra. A hardware entity, i.e., a comparator, compares the threshold against the maximum value to determine whether the value of the threshold is less or equal to the maximum amount and when the determination is positive, the scheduler module 104 or each of the job manager 114_X will use the value of the threshold. Should the determination be negative, e.g., due to a programming error, miss-configuration, and/or another error, the scheduler module 104 or each of the job managers 114_X will use the maximum amount.

In one aspect, the maximum amount for each engine 108_X is programmed into the scheduler module 104. Such programming may be performed during manufacturing, testing, or other opportune time, or performed by the control software executing on the host 102 during the system 100 initialization. The control software further programs the threshold to the scheduler module 104 upon the system 100 initialization. Accordingly, no communication between the scheduler module 104 and the job managers 114_X is necessary; as jobs for the different engines 108_X become available for scheduling, the scheduler module 104 pre-schedules jobs for each of the engines 108_X up to the engine's 108_X threshold.

In another aspect, the maximum amount for each engine 108_X is programmed into the respective job manager 114_X. Such programming may be performed during manufacturing, testing, or other opportune time, or provided by the control software executing on the host 102 during an initialization to the respective job manager 114_X. The control software further programs the threshold to the scheduler module 104. Each of the job managers 114_X then requests from the scheduler module 104 an amount of jobs less than or equal to the maximum amount; however, as jobs for the different engines 108_X become available for scheduling, the scheduler module 104 pre-schedules jobs for each of the engines 108_X up to the engine's 108_X threshold. Since in the aspect the scheduler module 104 does not need to know the maximum amount for each engine 108_X, the scheduler design is thus independent of the different combinations of job managers 114_X and engines 108_X. Additionally, the job manager 114_X controls the rate of the pre-scheduling requests.

In yet another aspect, the maximum amount for each engine 108_X is programmed into the respective job manager 114_X. Such programming may be performed during manufacturing, testing, or other opportune time, or provided by the control software executing on the host 102 during an initialization to the respective job manager 114_X. The control software further programs the threshold to the scheduler module 104. As jobs for the different engines 108_X become available for scheduling, the scheduler module 104 requests each of the job managers 114_X to provide a requested amount of jobs, and pre-schedules jobs for each of the engines 108_X less than or equal to the engine's 108_X threshold. Unlike the previous aspect, all the scheduling functionality is retained at the scheduler.

In yet another aspect, both the maximum amount and the threshold for each engine 108_X are programmed into the respective job manager 114_X. Such programming may be performed during manufacturing, testing, or other opportune time, or provided by the control software executing on the host 102 during an initialization to the respective job manager 114_X. As jobs for the different engines 108_X become available for scheduling, the scheduler module 104 requests each of the job managers 114_X to provide an amount of jobs. In response, the job manager 114_X provides an amount of jobs less than or equal to the threshold, and scheduler module 104 pre-schedules jobs for each of the engines 108_X up to the engine's 108_X threshold.

FIG. 2 depicts a flow chart of a process for job pre-scheduling and management in accordance with a load balancing criteria. In block 202, the system (100) is initialized. As part of the initialization, the control software provides configuration parameters including the threshold for pre-scheduling for each of the job managers (114_X), and each job manager (114_X) initializes for each of a plurality of the DSPs or HAs (112_X(X)) in a respective managed engine (108_X) a variable indicating a job slot to a pre-determined value. In one aspect, the pre-determined value is zero, i.e., job_slot_id=0. The process continues in block 204.

In block 204, the scheduler module 104 determines the amount of pre-scheduling in accordance with the pre-scheduling threshold and the maximum amount of pre-scheduling, by comparing the threshold to the maximum amount of pre-scheduling for each engine (108_X), and using the smaller of the two values to determine the amount of pre-scheduling. After the initialization, the control software may change a threshold for a specific engine (108_X) provided that there are no jobs currently assigned to the engine (108_X) and there are currently no jobs available to be scheduled on the engine (108_X). The process continues in block 206.

Figure 4A:
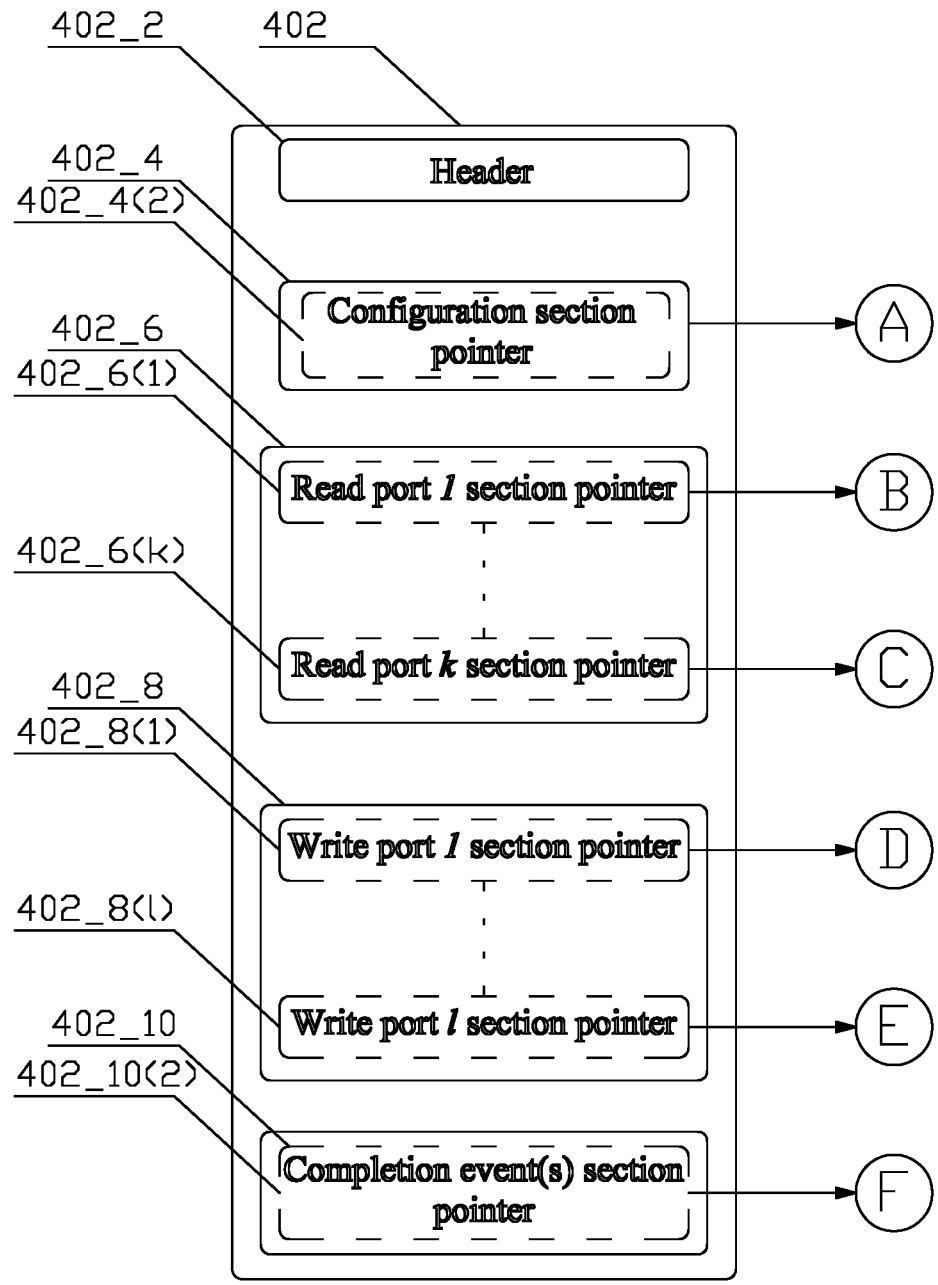
FIG. 4a depicts a first part of a block diagram of a conceptual structure 400 of a job descriptor in accordance with an aspect of this disclosure.
Figure 4B:
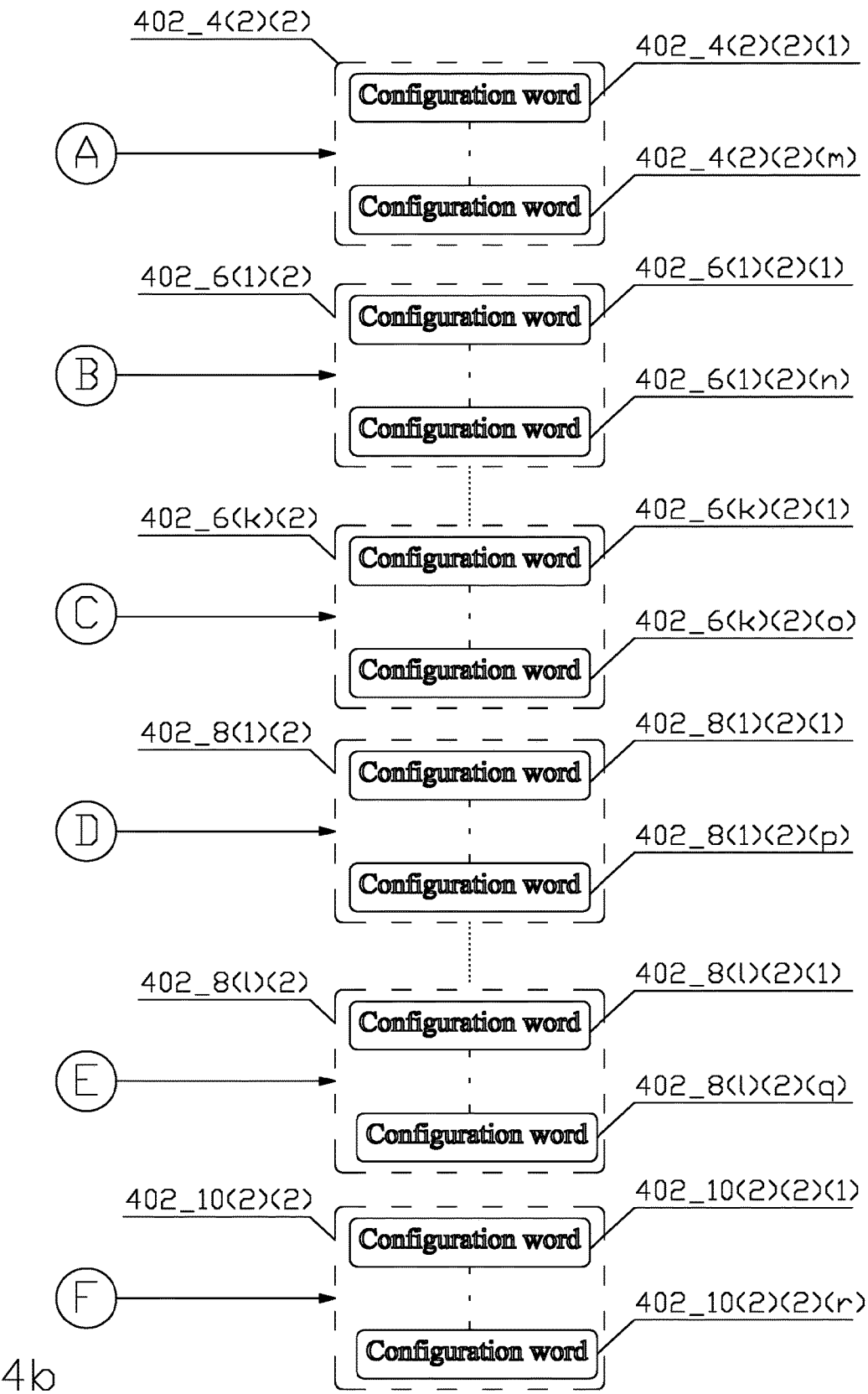
FIG. 4b depicts a second part of a block diagram of a conceptual structure 400 of a job descriptor in accordance with an aspect of this disclosure.

In block 206, the scheduler module 104 pre-schedules jobs to the each of the job managers (114_X) in accordance with the determined amount of pre-scheduling by providing the pre-scheduled jobs in the form of job descriptor(s) as disclosed in FIG. 4 and associated text supra. The process continues in block 208.

In block 208, the job manager (114_X) determines whether any of the plurality of the DSPs or HAs (112_X(X)) comprises at least one free job slot. The process continues in block 210 if none of the plurality of the DSPs or HAs (112_X(X)) comprises at least one free job slot; alternatively, the process continues in block 212.

In block 210, the job manager (114_X) waits and then returns into block 208. The wait may comprise a pre-determined time, or the wait may comprise a time before an external event notifies the job manager (114_X) that one of the plurality of the DSPs or HAs (112_X(X)) completed a job.

In block 212, the job manager (114_X) determines for each of the DSP(s) or HA(s) (112_X(X)) that have a free job slot, the number of the free job slots. The process continues to block 214.

In block 214, the job manager (114_X) determines the DSP(s) or HA(s) (112_X(X)) that have the most free job slots. The process continues in block 216 when a single DSP or HA(112_X(X) has the most free job slots; alternatively, the process continues in step 218 when multiple DSPs or HAs(112_X(X) have the most free job slots.

In block 216, the job manager (114_X) assigns the job to the DSP or HA (112_X(X)) and job slot identified by the job_slot_id. The process continues in block 222.

In block 218, the job manager (114_X) determines one of the multiple DSPs or HAs (112_X(X)) in accordance with a pre-determined policy, e.g., random selection, selection of the data processing device least recently selected, round-robin, weighted round-robin, deficit round-robin, or any method known to a person of ordinary skill in the art. The process continues in block 220.

In block 220, the job manager (114_X) assigns the job to the determined DSP or HA(112_X(X)) and job slot identified by the variable job_slot_id for the DSP or HA (112_X(X)). The process continues in block 222.

In block 222, the job manager (114_X) recalculates the value of the variable job_slot_id for the assigned DSP or HA (112_X(X)) as follows:

$$\text{next job\_slot\_id} = \text{mod}(\text{job\_slot\_id}+1; q) \qquad (\text{Eq. 1})$$

$$\text{job\_slot\_id} = \text{next job\_slot\_id} \qquad (\text{Eq. 2})$$

wherein mod is a modulo operation; and
q is a number of job slots for the DSP or HA.
The process returns to block 204.

Each DSP and/or HA(112_X(X)) comprises a plurality of physical read ports and write ports shown as communicative coupling between the DSP and/or HA(112_X(X)) and the DMA (116_X(2)) in FIG. 1) enabling the DSP and/or the HA (112_X(X)) to access the shared memory (120) via the communication coupling (106) to read data necessary for the job and/or to write data produced by the job. As disclosed supra, each DSP and/or HA (112_X(X)) may be capable of processing a plurality of jobs and each job may require the use of one or more of the ports. By means of an example, consider one of the DSP and/or HA(112_X(X)) that has job 1 assigned to a slot 0 requiring access to ports 0, 1, and 2, and job 2 assigned to a slot 1 requiring access to ports 0, 2, and 3. Because access to some of the ports, namely ports 0 and 2, is required by a plurality of jobs, namely job 1 and job 2, the job manager (114_X) must coordinate access to the ports by the jobs so that the data are delivered to/from the correct port to the correct job. In one aspect, coordinating access to the ports comprises programming the port with the correct configuration for each job in-order. The port's configuration for a job consists of the configuration words in the job descriptor section corresponding to the specific port.

Figure 3:
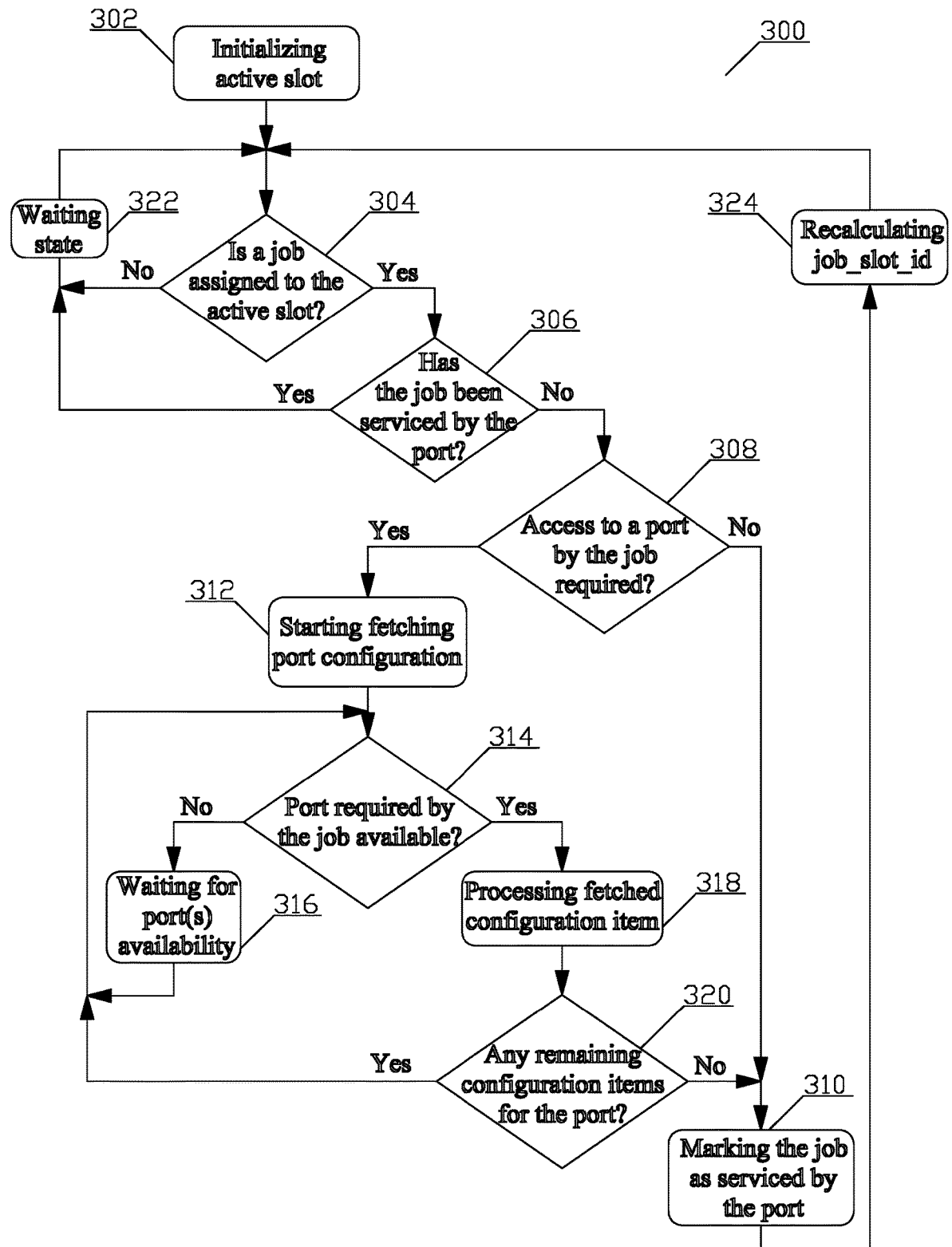
FIG. 3 depicts a flow chart of a process for managing port access in accordance with an aspect of this disclosure.

FIG. 3 depicts a flow chart of managing port access. In block 302, the system (100) is initialized. As part of the initialization, each job manager (114_X) initializes a separate port access process for each of one or more ports for each of one or more DSPs and/or HAs (112_X(X)). As part of the initialization, the job manager (114_X) sets a variable for each process indicating a job slot to a pre-determined value. In one aspect, the pre-determined value is zero, i.e., active_slot_id=0. The variables are stored in a structure inside the engine (108_(X)) (not shown), accessible by the job manager (114_X). Such a structure may comprise, e.g., an array of flip-flops, a static RAM, or another like structure known to a person of ordinary skill in the art. The process continues in block 304.

In block 304, the job manager (114_X) determines, by a reference to the structure, whether a job is currently assigned to the job slot identified by the active_slot_id. When the result is negative, the process returns to block 304, otherwise the process continues in block 306.

In block 306, the job manager (114_X) determines whether the job has already accessed the port associated with the process, and thus been serviced by the port. If the determination is positive, the process returns to block 304; otherwise, the process continues in block 308. In an aspect, the job enters a wait state 322, and after an expiration of the wait state returns the process into block 304. The wait state may expire upon expiration of a pre-determined time, or upon an external event, e.g., notifying the job manager (114_X) that the job has been assigned to a job slot, or any other external event known to one skilled in the art.

In block 308, the job manager (114_X) determines, whether the job assigned to the job slot identified by the active_slot_id requires an access to the port associated with the process. In one aspect, the job manager (114_X) makes the determination by examining whether the job descriptor's section for the port associated with the process comprises at least one configuration word. The process continues in block 310 when an access to the port associated with the process is not required; the process continues in block 312 when an access to the port associated with the process is required.

In block 310, the job manager (114_X) marks the job as having been serviced by the port and the process continues in block 324.

In block 324, the job manager (114_X) recalculates the value of the variable active_slot_id for the associated port as follows:

next active_slot_id=mod(active_slot_id+1;q)   (Eq. 3)

active_slot_id=next active_slot_id   (Eq. 4)

wherein mod is a modulo operation; and
q is a number of job slots for the DSP or HA (112_X(X)).

In block 312, since access to the port associated with the process is required, the job manager (114_X) can start fetching configuration words from the job descriptor section. The configuration words will be passed to the port identified by the active_slot_id one word at a time, with the timing controlled by the port's ability to accept the configuration words. The process continues in block 314.

In block 314, the job manager (114_X) determines whether the port associated with the process is available to accept the fetched configuration word. A port may be unavailable because the port may be servicing another job, or it may be busy servicing an earlier configuration word from the same job. The process continues in block 316 when the determination is negative; alternatively, the process continues in block 318 when the determination is positive.

In block 316, the port process within the job manager (114_X) enters a wait state for the port associated with the process to be available, and after expiration of the wait state returns the process into block 314. The wait state may expire upon expiration of a pre-determined time, or upon an external event, notifying the job manager (114_X) that the port associated with the process has become available to accept at least one configuration word.

In block 318, the fetched configuration word is provided to the port associated with the process, and the port processes the configuration word. The port process continues in block 320.

In block 320, the job manager (114_X) determines whether all the configuration words from the job descriptor section have been provided to the port associated with the process. If the determination is negative, the process returns to block 320, otherwise the process continues in block 310.

As disclosed supra, in block 312, the job manager 114_X starts fetching a section of the job descriptor for the port associated with the process from the shared memory 120. When the job descriptor is self-contained, the job manager 114_X reads the information comprising the different sections of the job descriptor, carries out the corresponding tasks, and indicates completion of processing the job descriptor. As further disclosed supra, the job descriptor may comprise zero or more sections. Regarding the job descriptor with zero sections, consider a DSP or HA (112_X(X)) that has been configured to execute a single function. That is, such a DSP or HA (112_X(X)) performs the same processing; therefore, there is no need for any job descriptor sections, and consequently a job descriptor. Consequently, a conceptual structure of an exemplary job descriptor 402, comprising more than one section is disclosed in FIG. 4.

Referring to FIG. 4, the job descriptor 402 comprises a header section 402_2, comprising data describing the job, e.g., number of read and/or write ports, interrupt setting, job timer settings, specific configuration parameters for the DSPs and/or HAs (112_X(X)), and other data known to a person of ordinary skill in the art.

The header section 402_2 may be followed by at least one job descriptor section 402_X. As depicted, each of the job descriptor section 402_X comprises one or more pointers, namely, a configuration section pointer 402_4(2), a plurality of read port section pointers 402_6(1)-402_6(k), a plurality of write port section pointers 402_8(1)-402_8(k), and a completion event(s) section pointer 402_10(2).

Each of the sections' 402_X pointers 402_4(2), 402_6(1)-402_6(k), 402_8(1)-402_8(k), 402_10(2). identifies a location 402_4(2)(2), 402_6(1)(2), 402_6(k)(2), 402_8(1)(2), 402_8(k)(2), 402_10(2)(2) in the one or more shared memories, where a sequence of a plurality of configuration words for the corresponding job descriptor section are stored. The format and interpretation of the configuration words can differ between the sections, and depends on the design and implementation of the DSPs and/or HAs (112_X(X)) and the job manager (114_X).

The configuration section location 402_4(2)(2) comprises configuration words 402_4(2)(2)(1)-402_4(2)(2)(m) that consist of parameters and initial settings for the DSPs and/or HAs (112_X(X)) to carry out the job-related tasks.

For each of the read port section location 402_6(1)(2)-402_6(k)(2), the first plurality of configuration words 402_6(1)(2)(1)-402_6(k)(2)(o) designates a second plurality of DMA commands that program a read DMA port to read data from a specific location(s) in the one or more memories. Each DMA command may comprise, e.g., a memory address, a size of data to be fetched, a particular pattern of data to be fetch, and other such parameters known to one skilled in the art.

Similarly, each of the write port section location 402_8(1)(2)-402_8(1)(2) comprises a first plurality of configuration words 402_8(1)(2)(1)-402_8(1)(2)($q$) that designate a second plurality of DMA commands that program a write DMA port to write output data from the job to specific location(s) in the one or more memories.

The relationship between DMA command(s) and designating configuration word(s) on the complexity of a DMA command and length of the configuration word. Thus, the relationship may be one-to-one, one-to-many, or many-to-one.

The completion event(s) section location 402_10(2)(2) comprises configuration words 402_10(2)(2)(1)-402_10(2)($r$) that compose instructions for actions for the DSPs and/or HAs (112_X(X)) and/or the job manager (114_X) to carry out upon the completion of processing a job.

In such aspect, the job manager 114_X must manage first fetch requests for the different sections 402_X from the job descriptor 402, and then fetch requests for the configuration words, corresponding to the locations pointed by the pointers 402_4(2), 402_6(1), 402_6($k$), 402_8(1), 402_8(1), and 402_10(2). The fetch requests are generated by requesting agents, i.e., entities requesting the data on behalf of a consumer of the data. The requesting agents may comprise, e.g., the DSPs or HAs 112_X(X), the DMA engines 116_X(X), and/or other components within the job managers 114_X. The consumers may comprise the physical ports of the DSPs or HAs (112_X(X)), and/or configuration ports for the DMA engines (116_X(X)) and/or other component(s) within the job manager 114_X, e.g., an entity for processing job completion events. In one aspect, a requesting agent requests data on behalf of a consumer; in another aspect, a requesting agent requests data on behalf of a plurality of consumers.

A person of ordinary skill in the art appreciates that other structures of job descriptor 402 are contemplated. Thus, by means of an example, the configuration words in the header section 402_(2) do not need to compose parameters, initial settings, or DMA commands, but may compose further indirection pointers that describe location(s) in the one or more memories where such parameters, settings or DMA are located. Similarly, any of the sections may be empty and may not be comprised of any configuration words. In that respect, consider an implementation of a job descriptor, which comprises a fixed number of sections for each of the DSPs or HAs (112_X(X)). Since certain jobs may not require all the sections, e.g., a specific HA (112_X(X)) may comprise two physical ports, but a specific job does not require use one of the ports, consequently, the job descriptor section for the not-used port is an empty, i.e., a zero-sized, section. Similarly, instead of the job descriptor section containing a pointer which identifies the location of the configuration words for the section, the job descriptor section may directly contain the configuration words, without the need for an indirection pointer. Similarly, the job descriptor section pointer may comprise an indirection pointer and additional parameters specifying, e.g., the size of the number of configuration words, and other such parameters known to one skilled in the art.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation. Additionally, the sequence of the steps may be re-arranged as long as the re-arrangement does not result in functional difference.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus for job pre-scheduling in a processing system comprising distributed job management, comprising:
    a control software executing on a host setting a threshold parameter less than or equal to a maximum amount parameter determined for each of a plurality of engines by determining the threshold parameter in accordance with a plurality of parameters comprising characteristics of a processing algorithm and characteristics of the processing system; and
    a scheduler, communicatively coupled to the host, configured to pre-schedule an amount of jobs less than or equal to the threshold parameter to at least one of a plurality of job managers communicatively coupled to the scheduler; wherein
    the at least one of the plurality of job managers managing one of the plurality of engines is configured to:
        determine order of at least one of a plurality of data processing devices for each pre-scheduled job; and
        assign the pre-scheduled job to the determined data processing device.

2. The apparatus as claimed in claim 1, further comprising:
    a comparator configured to compare the threshold parameter to the maximum amount parameter; and
    the scheduler or the at least one of the plurality of job managers further configured to set the threshold parameter equal to the maximum amount parameter if the threshold parameter is greater than the maximum amount parameter.

3. The apparatus as claimed in claim 1, wherein the control software executing on the host further:
programs the maximum amount parameter and the threshold parameter into the scheduler; and
wherein the scheduler pre-schedules the amount of jobs less than or equal to the threshold parameter to the at least one of the plurality of job managers by being configured to pre-schedule the jobs upon the jobs becoming available for scheduling.

4. The apparatus as claimed in claim 1, wherein the control software executing on the host further:
programs the maximum amount parameter and the threshold parameter into the at least one of the plurality of job managers; and wherein:
the scheduler requests each of the job managers to provide at least one of available jobs;
the at least one of the plurality of job managers is configured to provide the amount of jobs less than or equal to the threshold parameter; and
the scheduler pre-schedules the provided amount of jobs less than or equal to the threshold parameters to the at least one of the plurality of job managers.

5. The apparatus as claimed in claim 1, wherein the control software executing on the host further:
programs the maximum amount parameter into the at least one of the plurality of job managers;
programs the threshold parameter into the scheduler; and wherein:
the at least one of the plurality of job managers requests a first amount of jobs less than or equal to the maximum value; and
the scheduler pre-schedules the amount of jobs less than or equal to the threshold parameter in response to the request.

6. The apparatus as claimed in claim 1, wherein the control software executing on the host further:
programs the maximum amount parameter into the at least one of the plurality of job managers;
programs the threshold parameter into the scheduler; and
wherein the scheduler requests each of the at least one of the plurality of the job managers to provide a requested amount of jobs to be pre-scheduled, and pre-schedules the amount of jobs less than or equal to the threshold parameter in response to the provided amount of jobs less than or equal to the maximum amount parameter by the at least one of the plurality of job managers.

7. The apparatus as claimed in claim 1, wherein the at least one of the plurality of job managers determines one of the plurality of data processing devices at a managed one of the plurality of engines in order for each pre-scheduled job by being configured to:
determine a number of free job slots for each of the plurality of data processing devices;
assign the pre-scheduled job to a job slot identified by a job_slot_id of the data processing device with the highest number of free job slots; and
recalculate the value of the job_slot_id of the data processing device that was assigned the job.

8. The apparatus as claimed in claim 7, wherein the at least one of the plurality of job managers assigns the job to the job slot identified by the job_slot_id of the data processing device with the highest number of free job slots, by being configured to:
assign the pre-scheduled job to the job slot identified by the job_slot_id of the data processing device with the highest number of free job slots when a single data processing device has the highest number of free job slots;
determine one of a multiple data processing device in accordance with a pre-determined policy when multiple data processing devices have the highest number of free job slots; and
assign the pre-scheduled job to the job slot identified by the job_slot_id of the determined data processing device.

9. The apparatus as claimed in claim 7, wherein the at least one of the plurality of job managers recalculates the value of the job_slot_id of the data processing device that was assigned the job, by being configured to:
apply the equations $$\text{next\_job\_slot\_id} = \text{mod}(\text{job\_slot\_id}+1; q) \qquad \text{(Eq. 1)}$$

$$\text{job\_slot\_id} = \text{next\_job\_slot\_id} \qquad \text{(Eq. 2)}$$

wherein mod is a modulo operation; and
q is a number of job slots for the data processing device.

10. The apparatus as claimed in claim 7, wherein the at least one of the plurality of job managers is further configured to:
initialize for each of the plurality of data processing devices the job_slot_id to a predetermined value.

11. A method for job pre-scheduling in a processing system comprising distributed job management, comprising:
determining a maximum amount parameter of pre-schedulable jobs for each of a plurality of engines;
setting, for each of the plurality of engines, a threshold parameter less than or equal to the maximum amount parameter by determining the threshold parameter in accordance with a plurality of parameters comprising characteristics of a processing algorithm and characteristics of the processing system;
pre-scheduling by a scheduler an amount of jobs less than or equal to the threshold parameter to at least one of a plurality of job managers;
determining, by the at least one of the plurality of job managers managing one of the plurality of engines order of at least one of a plurality of data processing devices for each pre-scheduled job; and
assigning the pre-scheduled job to the determined data processing device.

12. The method as claimed in claim 11, further comprising:
comparing the threshold parameter to the maximum amount parameter; and
setting the threshold parameter equal to the maximum amount parameter if the threshold parameter is greater than the maximum amount parameter.

13. The method as claimed in claim 11, further comprising:
programming the maximum amount parameter and the threshold parameter into the scheduler; and
wherein the pre-scheduling by the scheduler the amount of jobs less than or equal to the threshold parameter to the at least one of a plurality of job managers comprises pre-scheduling the jobs upon the jobs becoming available for scheduling.

14. The method as claimed in claim 11, further comprising:
    programming the maximum amount parameter and the threshold parameter into the at least one of the plurality of job managers; and
    wherein the pre-scheduling by the scheduler the amount of jobs less than or equal to the threshold parameter to at least one of a plurality of job managers comprises:
        requesting by the scheduler each of the job managers at least one of available jobs;
        providing by the at least one of the plurality of job managers the amount of jobs less than or equal to the threshold parameter; and
        pre-scheduling the provided amount of jobs less than or equal to the threshold parameter the at least one of the plurality of job managers.

15. The method as claimed in claim 11, further comprising:
    programming the maximum amount parameter into the at least one of the plurality of job managers;
    programming the threshold parameter into the scheduler; and
    wherein the pre-scheduling by the scheduler the amount of jobs less than or equal to the threshold parameter to the at least one of a plurality of job managers comprises:
        requesting by the at least one of the plurality of job manager a first amount of jobs less than or equal to the maximum value parameter; and
        pre-scheduling the amount of jobs less than or equal to the threshold parameter in response to the request.

16. The method as claimed in claim 11, further comprising:
    programming the maximum amount parameter into the at least one of the plurality of job managers;
    programming the threshold parameter into the scheduler; and
    wherein the pre-scheduling by the scheduler the amount of jobs less than or equal to the threshold parameter to at least one of a plurality of job managers comprises:
        requesting by the scheduler each of the at least one of the plurality of job managers to provide a requested an amount of jobs to be pre-scheduled; and
        pre-scheduling by the scheduler the amount of jobs less than or equal to the threshold parameter in response to the provided an amount of jobs less than or equal to the maximum amount parameter by the at least one of the job managers.

17. The method as claimed in claim 11, wherein the determining, by the at least one of the plurality of job managers managing one of the plurality of engines, one of a plurality of data processing devices in order for each pre-scheduled job comprises:
    determining a number of free job slots for each of the plurality of data processing devices;
    assigning the pre-scheduled job to a job slot identified by a job_slot_id of the data processing device with the highest number of free job slots; and
    recalculating the value of the job_slot_id of the data processing device that was assigned the job.

18. The method as claimed in claim 17, wherein the assigning the job to the job slot identified by the job_slot_id of the data processing device with the highest number of free job slots, comprises:
    assigning the pre-scheduled job to the job slot identified by the job_slot_id of the data processing device with the highest number of free job slots when a single data processing device has the highest number of free job slots;
    determining one of a multiple data processing device in accordance with a pre-determined policy when multiple data processing devices have the highest number of free job slots; and
    assigning the pre-scheduled job to the job slot identified by the job_slot_id of the determined data processing device.

19. The method as claimed in claim 17, wherein the recalculating the value of the job_slot_id of the data processing device that was assigned the job, comprises:
    applying the equations $$\text{next\_job\_slot\_id} = \text{mod}(\text{job\_slot\_id}+1; q) \quad \text{(Eq. 1)}$$

$$\text{job\_slot\_id} = \text{next\_job\_slot\_id} \quad \text{(Eq. 2)}$$

wherein mod is a modulo operation; and
    q is a number of job slots for the data processing device.

20. The method as claimed in claim 17, further comprising:
    initializing for each of the plurality of data processing devices the job_slot_id to a predetermined value.

* * * * *